May 28, 1935.  A. NEVELING  2,002,748
HYDRAULIC DREDGE
Filed July 9, 1932   2 Sheets-Sheet 1
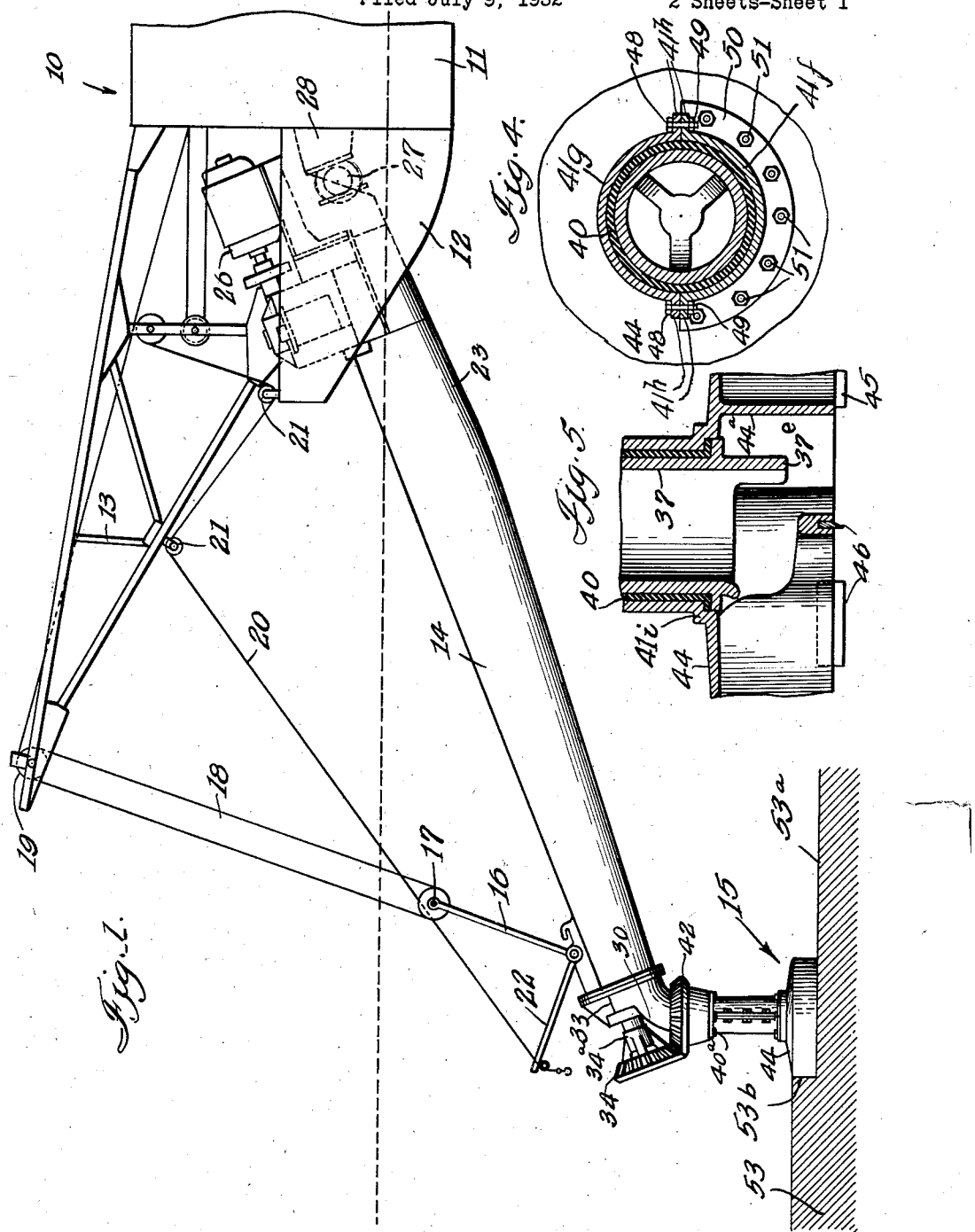

May 28, 1935.    A. NEVELING    2,002,748
HYDRAULIC DREDGE
Filed July 9, 1932    2 Sheets-Sheet 2
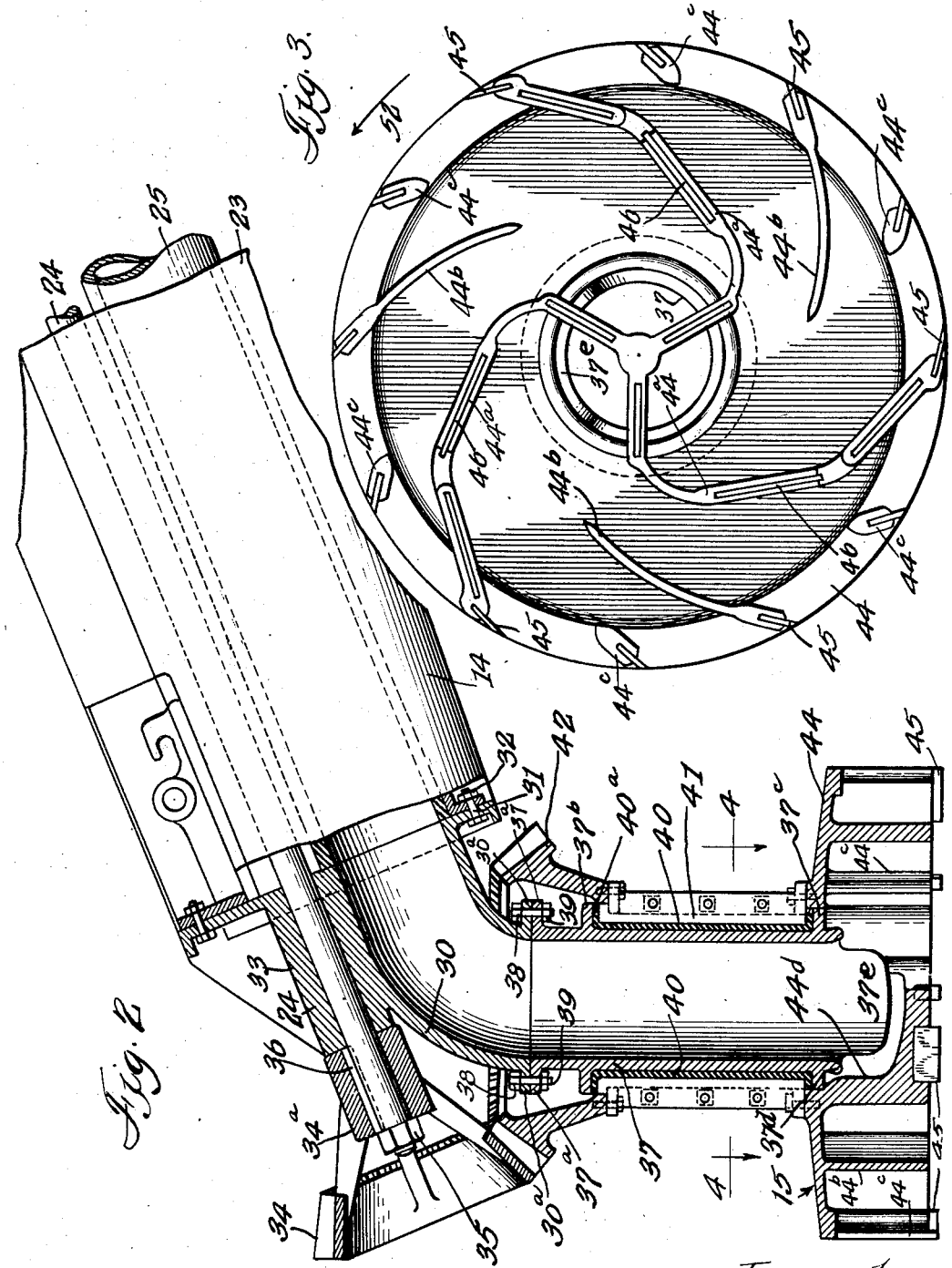

Patented May 28, 1935

2,002,748

UNITED STATES PATENT OFFICE 2,002,748

HYDRAULIC DREDGE

Aloys Neveling, Chicago, Ill.

Application July 9, 1932, Serial No. 621,662

13 Claims. (Cl. 37—65)

This invention relates to improvements in dredges of the hydraulic type and its purpose is to provide an improved construction which may be employed efficiently for removing material from the bottoms of rivers, harbors and the like, leaving a flat surface or other desired surface after the dredging operation has been completed. Heretofore hydraulic dredges have been commonly employed for so-called "cleaning up" operations in which a relatively thin layer of material, for example, one or two feet thick, is removed from the bottom of the river or harbor and it has been found that the barrel-shaped rotary hollow cutters which have been employed with this type of dredges are not well adapted for these operations because the dredge conduit and the cutter are usually directed at such an angle to the surface of the material being excavated that relatively small portions of the cutting blades of the cutter are utilized, thereby resulting in the cutting of successive furrows in the bottom as the boom of the dredge is swung laterally with the conduit to move the cutter over the desired arc, while, in addition, a relatively small amount of material is loosened by each rotation of the cutter so that a relatively large proportion of water is drawn into the suction of the conduit as compared with the amount of solid material. Owing to the fact that cutters of the type heretofore employed have been so constructed that they necessarily cut furrows or grooves in the bottom being excavated, it has been necessary to excavate below the desired mean level, thus requiring the removal of a lot of unnecessary material for which no compensation is received by the dredging contractor. A further disadvantage of these prior operations has been that the material cut off by the rotary cutter has been removed by those portions of the blade which are located adjacent the tip or nose of the cutter so that it is loosened at a point considerably removed from the mouth of the suction conduit, thus permitting large quantities of water to enter the conduit directly without intermingling with and drawing in the loosened solid material.

The principal object of the present invention is to overcome the above mentioned difficulties by providing a hydraulic dredge having an improved form of rotary cutter adapted to remove material from the bottoms of rivers, harbors and the like and leave a flat surface over the excavated area. A further object of the invention is to provide a hydraulic dredge having an improved form of rotary cutter having a lower flat surface provided with cutting blades adapted to remove the solid material which is carried by these blades directly into the suction channel which communicates with the central part of the cutter. Still another object of the invention is to provide a hydraulic dredge comprising a rotary cutter of cylindrical form having cutting blades around its annular outer edge and provided also with spirally arranged cutting blades on its lower end so arranged that they remove the material from the bottom and convey this material, as well as the material removed by the first-named blades, inwardly toward the suction channel by which the material is conveyed upwardly to the hoppers of the dredge. Another object of the invention is to provide a rotary cutter for dredges comprising a series of cutting blades which extend inwardly to points in proximity to the mouth of a suction channel so that the material removed by the blades is drawn directly into the suction channel without the inclusion of an excessive quantity of water. Other objects relate to various features of construction and arrangement which will appear more fully hereinafter.

The nature of the invention will be understood from the following specification taken with the accompanying drawings, in which one embodiment is illustrated. In the drawings, Fig. 1 shows a side elevation of the forward portion of a hydraulic dredge including the improved features of the present invention;

Fig. 2 shows an enlarged side elevation of the lower portion of the suction conduit of the dredge with the connected rotary cutter and associated parts shown in vertical axial section;

Fig. 3 shows an enlarged bottom plan view of the rotary cutter shown in Fig. 2;

Fig. 4 shows a transverse horizontal section taken on the line 4—4 of Fig. 2; and Fig. 5 is a partial vertical section similar to that of Fig. 2 showing a modified form of construction of the rotary cutter.

The invention is illustrated in the drawings in connection with a dredge 10 comprising a hull 11 having projecting from the forward end thereof a pair of beams 12 and a cantilever frame or boom 13. The cantilever beams 11 are adapted to support the inner end of a digging arm or ladder 14 which carries at the outer end thereof the rotary cutter indicated generally at 15. The outer portion of the ladder 14 is connected through a member 16 with pulleys 17 and a cable 18 is passed around these pulleys and around another set of pulleys 19 on the outer end of the boom 13, with a portion of the cable extending inwardly through the boom to the hull of the dredge where it may be wound or unwound by a suitable winch for the purpose of raising or lowering the ladder or digging arm. Another cable 20 extends over pulleys 21 mounted on the boom and is attached to a member 22 carried by the outer end of the ladder for controlling the movements of the ladder during the digging operations. The ladder or digging arm 14 comprises an outer shell 23 having mounted therein a rotary operating shaft 24 and a tubular conduit 25 through which the excavated material is conveyed. The shaft is rotated by an electric motor 26 mounted on the inner end of the arm or ladder 14 and the conduit 25 is connected through a universal joint 27 with a conduit 28 through which the excavated materials are conveyed to hoppers or storage spaces on the hull 11.

The outer end of the arm or ladder 14 is secured to an elbow 30 by means of bolts 31 and nuts 32 passing through radial flanges on the elbow and on the outer end of the arm, as shown particularly in Fig. 2. The operating shaft 24 is journaled in a bearing 33 which is formed as an integral part of the elbow 30 and the outer end of the shaft engages the hub 34a of a beveled pinion 34 which serves to drive the rotary cutter. This pinion is secured on the shaft by a nut 35 and is held against rotation by a key 36. The elbow 30 is provided at its lower end with an annular flange 30a which seats against a flange 37a formed on the upper end of a vertical conduit 37. These flanges are secured together by bolts 38 and nuts 39 so that the material excavated may pass upwardly through the conduit 37 and thence through the elbow 30 into the inclined conduit 25. The conduit 37 is provided adjacent its upper end with another annular flange 37b and adjacent its lower end with an annular flange 37c. A rubber gasket or bushing 40 is mounted on the conduit 37 between the flanges 37b and 37c and this bushing has outwardly extending flanges 40a at its ends which coact with the faces of the flanges on the conduit. This rubber bushing is adapted to form a bearing for a sleeve 41 which constitutes the hub of the rotary cutter 15. The upper end of this sleeve 41 is formed integrally with or secured to a beveled gear 42 which meshes with the previously described pinion 34 so that when the operating shaft 24 is rotated by the motor 26, the cutter 15 is rotated to excavate the material which is drawn upwardly through the conduits by a suitable suction pump connected to the conduit 28 on the dredge.

The lower end of the sleeve or hub 41 is formed integrally with or secured to a radially extending blade or disk 44 which forms a part of the cutter proper and which has formed integrally therewith a series of vanes 44a, 44b and 44c upon which are mounted cutting blades 45. The blade or disk 44 is apertured at its center to receive the flange 37c of the conduit 37 and the vanes 44a, illustrated as being three in number in this embodiment, are united with each other at their inner ends and extend outwardly therefrom in irregular spiral fashion, the inner portions extending radially outward from the point of connection and being united with other portions which are substantially at right angles thereto, while these latter portions are each united with an outer portion disposed at a relatively sharp angle to the periphery of the disk 44. Each of these vanes 44a carries at its outer end one of the vertically extending blades 45 which is inclined to a cylinder containing the peripheral surface of the disk 44 and, in addition, each vane 44a carries a series of downwardly extending blades 46 which are mounted on the lower edges thereof and which project beneath the lower edges of these vanes, as shown particularly in Fig. 2. At points opposite the mouth of the conduit 37, the vanes 44a are cut away from their upper sides as shown at 44d in order to prevent obstruction of the flow of materials to the mouth of the conduit through the spaces between adjacent vanes 44a. The vanes 44b converge inwardly with the vanes 44a but terminate at their inner edges outwardly from the periphery of the conduit 37. The outer ends of these vanes 44b are equipped with cutting blades 45 which have a similar sharp incline with respect to the periphery of the cutter, like the cutting blades carried by the vanes 44a. The other vanes 44c are comparatively small in horizontal dimensions, being constructed as bars extending downwardly from the disk 44 adjacent its extreme outer edge with each vane 44c located substantially midway between the outer edge of the vane 44b and the outer edge of the next adjacent vane 44a, there being two vanes 44c located on opposite sides of each vane 44b. The vertical dimensions of all of the vanes 44a, 44b and 44c are preferably the same and the cutting edges of their blades 45 terminate in the same imaginary cylindrical surface. The lower end of the conduit 37 terminates in an outwardly directed annular flange 37d which extends downwardly into the space formed by the cut away portions 44d of the vanes 44a and at one side thereof this flange 37d is extended downwardly to form an apron 37e located on the side of the conduit toward the dredge and in a direction generally parallel to the direction in which the cutter is swung by the lateral movement of the arm or ladder 14 about a vertical axis, the purpose of this apron being to prevent an excessive quantity of water from being drawn into the conduit from that side of the cutter opposite the side where the cutting operations are taking place. Alternate cutting blades may have teeth to loosen the material between knife edge blades.

In order to assemble the cutter upon the gasket 40 carried by the conduit 37, the sleeve or hub portion 41 of the cutter is provided with a removable section 41f of substantially semicircular cross-section. This section, and the other section 41g which is integrally united with the disk 44 and the gear 42, are provided with outwardly extending flanges 41h which are secured together by bolts 48 and nuts 49 after the parts have been assembled. In order that the removable section 37f of the hub or sleeve may be firmly held in place independently of the bolts 48 and nuts 49, there are provided a pair of semicircular retaining members 50 which are secured to the lower face of the gear 42 and to the upper face of the disk 44 by studs 51, as shown particularly in Figs. 2 and 4. The aperture in the lower part of the gear 42 at the upper end of the hub or sleeve 41 is of sufficient size to permit the gear to be passed over the flange 37c at the lower end of the conduit with the conduit section 41f removed and then, when the cutter has been elevated to a point where the gear 42 meshes with the pinion 34 and the upper end of the sleeve section 41g seats against the upper flange of the bushing 40, the removable section 41f of the conduit is put in place and connected to the other section by the bolts 48 and nuts 49. The lower end of the sleeve or hub 41 then rests upon the lower flange of the bushing 40 which is in turn carried by the lower flange 37ᶜ of the conduit 37. The cutter 15 is thus rotatably mounted upon the conduit section 37 so that it may be moved about when the arm or ladder 14 is swung in a horizontal plane with respect to the hull of the dredge.

In Fig. 5 of the drawings, there is shown a construction which is a modification of that previously described to the extent that the hub 41 of the cutter is united with the disk portion 44 thereof through an integral flange 41ᶠ, instead of employing the separate flange and bolts as illustrated in Fig. 2. The cutter is thus carried by the hub and may be applied to the conduit 37 by having one side 41ᵍ of the hub detachable, as illustrated in Fig. 4.

In the operation of this invention, the digging arm or ladder 14 is lowered from the boom 13 until the cutter 15 occupies the desired position with the lower face thereof extending substantially in a horizontal plane. The cutter 15 is rotated in the direction indicated by the arrow 52 in Fig. 3 and as it engages the bottom, the blades 46 on the lower edges of the vanes 44ᵃ cut away the material of the bottom within a circular area determined by the area of the cutter, and this material is directed into the spaces between the vanes 44ᵃ with the result that it is directed inwardly by them to the space immediately below the mouth of the conduit 37. The suction exerted through the conduit 25 then takes effect with the result that this material and a certain amount of water mixed therewith is drawn upwardly by suction through the conduit 37, the elbow 30 and the conduit 25 from which it is received and discharged into the hull of the dredge through the conduit 28. When this excavation by the lower cutting blades 46 has been carried out sufficiently to cause the cutter 15 to occupy the desired level, the ladder or digging arm 14 is then swung in a horizontal direction with the result that the earth 53 at the bottom of the river or harbor is cut away along a new bottom plane 53ᵃ while the blades on the circular edge of the cutter cut away the material along upright lines 53ᵇ. When the blades 45 are brought into action by the swinging of the arm or ladder 14, the material is cut off from the upright face of the earth and is directed inwardly between the vanes which, by reason of their direction of rotation, deflect it to the mouth of the conduit 37 so that it is immediately acted upon by the suction exerted through the conduit. During these operations, a considerable quantity of water is drawn in with the solid material to make a fluid mass which may be drawn readily through the conduit and in order that an excessive quantity of water may not enter the conduit and thereby decrease the efficiency of the dredging operations, the apron 37ᵉ has been provided to shut off partially the flow of water toward the central part of the cutter from the side of the cutter opposite that on which the cutting blades are operating. The dredging mechanism may thus be employed to full capacity in removing solid material with a minimum quantity of water and the formation of the cutter is such that the action of the suction conduit is materially aided by the vanes which direct the material in a positive manner inwardly toward the mouth of the conduit. The speed of rotation of the cutter may be varied to suit the character of the material being excavated and the cutter may be rotated with a minimum expenditure of power due to the provision of the rubber bushing 40 which is abundantly lubricated by the water so that the cutter revolves freely thereon. There is thus provided an improved form of dredging mechanism which may be employed to excavate comparatively small layers of material at the bottom of a river or harbor without the necessity of excavating any excess material beyond that required and without leaving a furrowed or uneven surface.

Although one form of the invention has been shown or described by way of illustration, it will be understood that it may be constructed in various other forms coming within the scope of the appended claims.

I claim:

1. The combination in a dredge, of a downwardly inclined suction conduit, and a cutter rotatably mounted on the lower end of said conduit, said cutter having a lower cutting blade of general spiral form comprising a series of sections arranged end to end, said sections being of linear form and being relatively inclined to each other.

2. The combination in a dredge, of a suction conduit, a disk rotatably mounted on the end of said conduit, a plurality of vanes united with each other beneath the center of said disk and with the under side of said disk, said vanes extending outwardly in spiral fashion, and other vanes carried by the under side of said disk and extending inwardly between said first named vanes.

3. The combination in a dredge, of a suction conduit, a disk rotatably mounted on the end of said conduit, a plurality of vanes united with each other beneath the center of said disk and with the under side of said disk, said vanes extending outwardly in spiral fashion, other vanes carried by the under side of said disk and extending inwardly between said first named vanes, and vertically extending cutting blades mounted on the outer ends of said vanes.

4. The combination in a dredge, of a suction conduit, a disk rotatably mounted on the end of said conduit, a plurality of vanes united with each other beneath the center of said disk and with the under side of said disk, said vanes extending outwardly in spiral fashion, other vanes carried by the under side of said disk and extending inwardly between said first named vanes, vertically extending cutting blades mounted on the outer ends of said vanes, and other cutting blades mounted on the lower edges of said first named vanes and having horizontal cutting edges.

5. The combination in a dredge, of a suction conduit, a disk having an aperture to receive the mouth of said conduit, means for rotating said disk, and a plurality of vanes carried by the under side of said disk and extending outwardly from the central portion thereof, said vanes being united with each other and being cut away on their upper edges below the mouth of said conduit.

6. The combination in a dredge, of a suction conduit, a disk having an aperture to receive the mouth of said conduit, means for rotating said disk, a plurality of vanes carried by the under side of said disk and extending outwardly from the central portion thereof, said vanes being united with each other and being cut away on their upper edges below the mouth of said conduit, cutting blades carried by said vanes, and an apron carried by said conduit at one side thereof and extending downwardly into the space formed by cutting away portions of said vanes.

7. The combination in a dredge, of a suction conduit, a disk having an aperture to receive the mouth of said conduit, means for rotating said disk, a plurality of vanes carried by the under side of said disk and extending outwardly from the central portion thereof, said vanes being united with each other and being cut away on their upper edges below the mouth of said conduit, cutting blades carried by said vanes, an apron carried by said conduit at one side thereof and extending downwardly into the space formed by cutting away portions of said vanes, and additional cutting blades mounted on the lower edges of said vanes and having their cutting edges directed horizontally.

8. The combination in a dredge, of a conduit and a cutter rotatably mounted on the end of said conduit and comprising a disk having a plurality of vanes formed on the under side thereof and extending inwardly in substantially spiral fashion from the edge thereof, each of said vanes comprising a central portion extending radially outward, an adjacent portion extending substantially at right angles thereto, and an outer portion extending at an angle to said second named portion in a direction opposite to said first named portion.

9. The combination in a dredge, of a conduit and a cutter rotatably mounted on the end of said conduit and comprising a disk having a plurality of vanes formed on the under side thereof and extending inwardly in substantially spiral fashion from the edge thereof, each of said vanes comprising a central portion extending radially outward, an adjacent portion extending substantially at right angles thereto, an outer portion extending at an angle to said second named portion in a direction opposite to said first named portion, each of said portions having a straight lower edge, and a straight blade mounted on each of said straight edge portions of each of said vanes.

10. The combination in a dredge, of a conduit and a cutter rotatably mounted on the end of said conduit and comprising a disk having a plurality of vanes formed on the under side thereof and extending inwardly in substantially spiral fashion from the edge thereof, each of said vanes comprising a central portion extending radially outward, an adjacent portion extending substantially at right angles thereto, an outer portion extending at an angle to said second named portion in a direction opposite to said first named portion, each of said portions having a straight lower edge, and a straight blade mounted on each of said straight edge portions of each of said vanes, said blades being mounted so that their lower edges travel in a horizontal plane upon rotation of said cutter.

11. The combination in a dredge, of a suction conduit having a vertical lower end portion, a cutter having a tubular hub journaled on said tubular end portion, and an annular compressible member inserted between said vertical portion of said conduit and the hub of said cutter.

12. The combination in a dredge, of a suction conduit having a vertical lower end portion, a cutter having a tubular hub journaled on said tubular end portion, and an annular rubber bushing inserted between the vertical portion of said conduit and the hub of said cutter.

13. The combination in a dredge, of a suction conduit having a straight end portion, a rotary cutter having a hub journaled on said end portion, said hub comprising a detachable half section, and means for securing said half section to the remainder of said cutter.

ALOYS NEVELING.